United States Patent [19]

Jahn

[11] Patent Number: 5,247,861
[45] Date of Patent: Sep. 28, 1993

[54] METHOD OF MANUFACTURING LAMINATED PLASTIC TOOLING AND TOOLING PRODUCED THEREBY

[75] Inventor: E. Mark Jahn, Jamul, Calif.
[73] Assignee: Rohr, Inc., Chula Vista, Calif.
[21] Appl. No.: 865,052
[22] Filed: Apr. 8, 1992
[51] Int. Cl.$^5$ .................................................. B21K 5/20
[52] U.S. Cl. ........................... 76/107.1; 76/DIG. 6; 51/165.71; 364/474.04
[58] Field of Search .............. 76/107.1, 101.1, DIG. 6; 364/474.02, 474.04, 474.08, 474.22, 474.24, 474.25; 51/165.71

[56] References Cited

U.S. PATENT DOCUMENTS 2,679,172  5/1954  Clevenger et al. ................ 76/107.1
5,031,483  7/1991  Weaver ............................ 76/107.1

Primary Examiner—Roscoe V. Parker
Attorney, Agent, or Firm—Patrick J. Schlesinger; Frank D. Gilliam

[57] ABSTRACT

A method of producing laminated plastic tooling suitable for use in forming sheet material by techniques such as stretch forming, hydroforming, etc. The detailed overall method comprises the steps of designing the desired tool configuration (typically by computer-aided design), machining a suitable tool baseplate, cutting plastic boardstock into suitably sized boards, trial stacking the boards to the general tool configuration, determine that stack has the correct dimensions, unstacking and cleaning the board surfaces, restacking with an adhesive between all abutting boards with clamping as necessary, curing the adhesive, machining the stack to the required configuration under numerical control, sand the shaped tool to the desired surface smoothness, check the tool with a coordinate measuring machine and coat the tool with any desired surface coating, such as an anti-chafe coating. The resulting tool is highly accurate and is capable of long-term production use. The tool can be easily modified if damaged or changes are desired by simply machining away portions to flat surfaces, bonding blocks to those surfaces and repeating the machining and finishing steps.

28 Claims, 1 Drawing Sheet

METHOD OF MANUFACTURING LAMINATED PLASTIC TOOLING AND TOOLING PRODUCED THEREBY

BACKGROUND OF THE INVENTION

This invention relates in general to the manufacture of tooling for shaping sheet material into three-dimensional shapes and, more specifically, so a method for laying up plastic blocks into a configuration from which the desired tool contour can be formed by numerically controlled machining and a method of modifying such tooling.

Tools in the form of patterns, core boxes, molds or dies are customarily used in manufacturing industries to accurately produce large numbers on identical parts or products. The manufacturing tool may be a single mold or die or a pair of complementary mold members having corresponding shaping surfaces. Such molds may be used to form products from hardenable liquid materials such as by casting, injection molding or compression molding. Softened sheet materials may be formed against dies by compression molding, blow molding and vacuum forming processes. Unsoftened sheet materials may be formed over dies by stretch forming, hydroforming, drawing with draw die punch and ring assemblies, etc.

A very large number of methods have been developed to produce mold or die surfaces having very precise contours for use in these shaping methods. Large shaping surfaces are conventionally formed by machining a very large block, forming a very large metal, ceramic or plastic shape and hand finishing the shaping surfaces to the desired dimensions. These large dies are difficult to form and considerable material is wasted in the machining and finishing steps. In order to reduce the cost, handling problems and large scale machining, attempts have been made to form mold or die surfaces from stacked laminations, each of the lamina being cut out in a way that the stack will have the desired cavity, as described by Clevenger et al in U.S. Pat. No. 2,679,172 to form a female casting mold. Foam slabs are cut with a hot wire under computer control as described by DeMenthon in U.S. Pat. No. 4,675,825 and glued together to form models, molds or cores.

Weaver, in U.S. Pat. No. 5,031,483, a large number of very thin laminations are each cut under computer control so that the laminations may be stacked and aligned to produce cooperating male and female molds for use in casting glass, plastic and metal products.

While these mold forming methods are effective in the casting of liquid or nearly liquid materials, they have not been effectively applied to the manufacture of dies for reshaping solid sheet materials. In the past tooling for reshaping large metal sheets has generally been made by machining a large metal block in to the desired contour or casting the large shape from plaster or the like. The tooling often has a three-dimensional shape over which the metal is reshaped by stretch forming, hydroforming, and other methods.

Typically, Miura, in U.S. Pat. No. 5,081,861, describes a die system for pressing sheet metal in which a die mold is coated with an epoxy resin, cloth layers are bonded to the resin layer and the interior of the mold is filled with a mixture of sand and an epoxy resin. While a strong and inexpensive die is made by this method, the method requires a carefully shaped mold, so that the shape of the die cannot be conveniently changed or repaired if damaged.

Although these large dies have been effective, they are very expensive to manufacture and wasteful of material. While some are machined by numerically controlled machining techniques, there is no convenient way to check the machining program for errors prior to machining a large and expensive block of material. Also, repairing any damage that might occur to the die or modifying the die after machining is difficult and expensive. Attempts to make such dies by laminating techniques such as those described above for use in the casting industries similarly suffer from the expense of cutting a large number of laminae and difficulty in achieving a precise assembly. The final assembled die again is difficult and expensive to repair or modify.

Thus, there is a continuing need for improved methods of manufacturing dies for use in forming large sheets of material, such as in the stretch forming of large metal panels.

SUMMARY OF THE INVENTION

The above-noted problems, and others, are overcome in accordance with the method of this invention which comprises the steps of cutting plastic boardstock into suitably sized boards, trial stacking the boards into the general desired tool configuration, determining that the stack has the desired configuration, unstacking the boards, cleaning the board surfaces, applying an adhesive to the boards in required areas, restacking the boards and clamping as necessary, curing the adhesive, machining the stack to the selected configuration under computer control, smoothing the surface and applying any desired coating to the surface.

If the tool surface is damaged, or a dimensional modification is desired, appropriate areas are machined away to provide a flat, typically horizontal, surface, an appropriate piece of the boardstock is adhesively bonded to that surface and the machining and finishing steps are repeated.

This tool is inexpensive to manufacture, using standard sized boardstock manufactured from any suitable plastic material having the desired strength and machining characteristics. The tool has a long production life and is easily repaired or modified.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
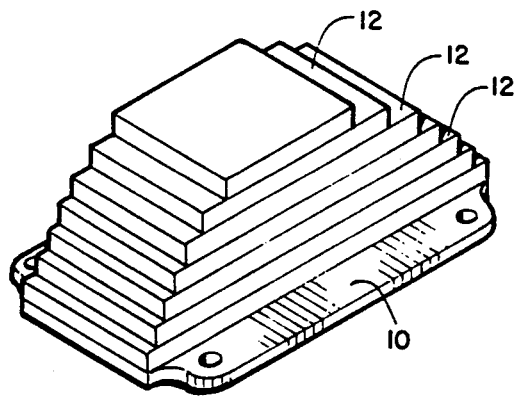
FIG. 1 is a schematic perspective view of the assembled blocks read for machining.

Referring now to FIG. 1, there is seen a baseplate 10 on which is stacked a plurality of plastic boards 12 which are cut to selected lengths and laid up in a pattern representing the desired tool configuration.

The boards are cut to the required dimensions from standard large boards. With large or long tools, shorter boards may be adhesively bonded in an abutting relationship to give the required overall length. Sawing of the boards to produce abutting ends should be carefully done to achieve a surface finish near to that obtained by milling. The edges should be square and uniform in order to achieve the preferred 0.010 to 0.125 inch thick bond line for vertical joints.

Any suitable plastic material may be used for boards 12. The material desirably is easily machined with standard numerically controlled milling machine tools, has the strength necessary to resist the forces imposed during stretch forming or other methods of forming sheet materials over the tool and is easily and solidly bonded into a unitary mass. In generally, the material should be dimensionally stable over a temperature of from about 0° to 250° F., with preferably a low coefficient of thermal expansion. Typical plastic materials include epoxy, polyurethane or any other thermosetting or thermoplastic material or mixture of materials having the requisite characteristics. The board materials may include a filler which adds strength, alters the coefficient of thermal expansion, aids machinability, replace the more expensive resin, etc. Fillers may have any suitable shape, such as fibers, platelets, spheres, random particles, etc. Compositions could include plastics waxes, minerals, ceramics clay, etc. Other additives, to improve machinability, absorb ultraviolet, add stability, retard combustion, etc. Best results have been obtained with urethane and epoxy plastics, either alone or with from about 20 to 50 per cent of a boro silicate filler.

Foam cores may be inserted in boards in areas that are not machined. Typically a polyurethane or styrofoam foam may be used. A thickness of about 3 to 5 inches of plastic around the foam core is preferred.

Any suitable board size may be used, depending on the size of the tool to be made and convenience of handling. Typically, boards may range from about $2'' \times 12'' \times 18''$ to about $8'' \times 36'' \times 96''$. For an optimum combination of handling ease and efficient tool construction, $1'' \times 24'' \times 60''$ and $2'' \times 24'' \times 60''$ solid boards are preferred. For boards including a foam core, $2'' \times 28'' \times 60''$ is preferred. The primary reason for these standard board sizes is ease of handling, since a pair of workers can reasonably handle the 100 to 300 lb. that these boards typically weigh.

The boards are preferably initially laid up without adhesive as shown in FIG. 1 to permit the layup to be checked for dimensional accuracy. Once the layup is found to be correct, the stack is disassembled, the boards are cleaned with a suitable solvent, such as naphtha to eliminate dirt, grease and the like. A suitable adhesive is applied to the surfaces to be bonded and the boards are again stacked. The adhesive is cured, with clamping and heat if required by the adhesive selected.

Adhesive tensile strength at the bond in the range of about 7000 to 17,000 is generally required to give sufficient strength to the laminated structure. The adhesive must fully wet the boardstock surface, allow maintenance of a consistent bond line thickness, squeeze out on clamping and stay in place without running out between the boards. A mixed viscosity of about 2400 to 5000 cps is preferred, with optimum results at about 2700 cps. Pot life of from about 10 minutes to 4 hours is suitable. Preferably, the cured adhesive has a thickness of from 0.010 to 0.125 inch on vertical joints and from about 0.010 to 0.060 on horizontal joints for optimum strength. Typical adhesives include epoxy, urethane, and acrylic. A two component, amine cured, toughened epoxy adhesive, such as 502 RT available from Advanced Polymer Industries, is preferred for optimum physical characteristics.

Figure 2:
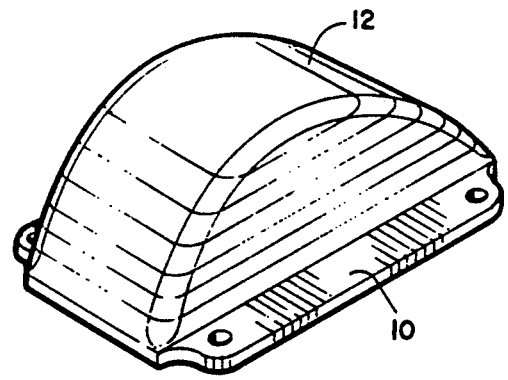
FIG. 2 is a schematic perspective view of the tool after machining.
Figure 3:
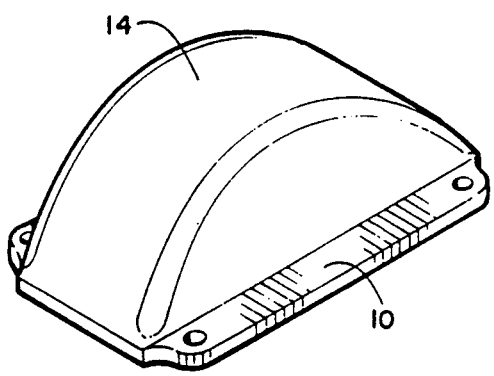
FIG. 3 is a schematic perspective view of the tool after finish coating ready for production use.

Once the adhesive has fully cured, the assembly is machined under computer control to the desired configuration on a conventional numerical controlled milling machine, to the configuration shown in FIG. 2. The tool is machined just slightly oversized to allow for removal of milling tool irregularities by sanding.

The configuration of the tool is checked on a conventional coordinate measuring machine. Any errors in the configuration can be repaired by the method described below.

Figure 4:
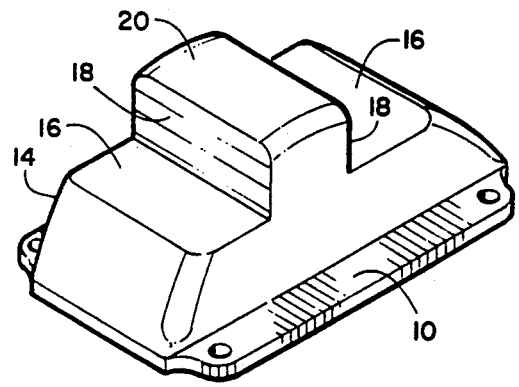
FIG. 4 is a schematic perspective view of the tool with selected regions machined away for tool modification.

Once the tool is found to have the precise required dimensions, it is coated with any suitable coating 14 as indicated in FIG. 4 and the tool is ready for production use. Typical coatings include anti-chafing coatings such as teflon filler epoxy, or other coatings such as water based acrylic or urethane.

Figure 5:
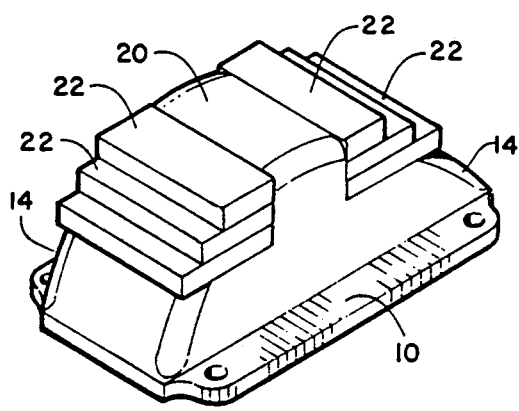
FIG. 5 is a schematic perspective view showing new blocks applied in the regions being modified.
Figure 6:
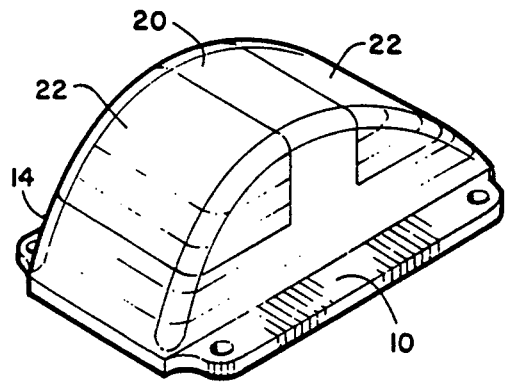
FIG. 6 is a schematic perspective view showing the modified tool after machining.

If the tool requires modification or repair due to damage or wear, such changes can be easily made as shown in FIGS. 4–6. Is indicated in FIG. 4, those portions of the coated tool 14 are milled away to produce flat, preferably horizontal regions 16 with a preferably vertical wall 18 substantially perpendicular to horizontal region 16, leaving an upstanding portion 20 of the original tool remaining.

As shown in FIG. 5, pieces of boardstock 20 are then cut, fitted, checked, cleaned, coated with adhesive and laminated in place in the same manner as the original tool was made, as detailed above.

Finally, the tool is milled under computer control to the new configuration. Surfaces remaining from the original tool may be left unchanged or may be further machined. The added blocks 22 may be machined to match the contour of the original tool or may have any other configuration, as desired. Generally, after completion of the numerically controlled milling, the entire tool is sanded to smooth the newly milled areas and remove the coating 14 from the remaining portions of the original tool. Then, the tool may be recoated and is ready for production use.

These repair and/or modification steps can be repeated as many times as desired. Thus, a new tool need not be constructed whenever damage occurs or modification is desired.

While certain preferred arrangements, shapes and materials were detailed in the above description of preferred embodiments, those may be varied, where suitable, i.e. concave shapes and combinations of convex and concave shapes, with similar results. Other applications, variations and ramifications of this invention will occur to those skilled in the art upon reading this disclosure. Those are intended to be included within the scope of this invention, as defined in the appended claims.

I claim:

1. The method of manufacturing laminated plastic tooling which comprises the steps of:
   providing a baseplate;
   assembling a plurality of pieces of plastic boardstock in a selected arrangement corresponding to a desired tool configuration on said baseplate;
   checking the accuracy of said assembly configuration; removing said pieces;

cleaning surfaces of said pieces that were in contact with other pieces in said assembly;
coating said cleaned surfaces with an adhesive; reassembling said assembly;
curing said resin;
milling said assembly to said tool configuration under computer control; and
smoothing the surface of said tool.

2. The method of manufacturing laminated plastic tooling according to claim 1 including the further step of applying an anti-chafing coating to the smoothed surface of said tool.

3. The method of manufacturing laminated plastic tooling according to claim 1 wherein said boardstock is formed from a material selected from epoxy and polyurethane resins.

4. The method of manufacturing laminated plastic tooling according to claim 1 wherein said adhesive is a two component, amine cured, epoxy resin.

5. The method of manufacturing laminated plastic tooling according to claim 1 wherein said adhesive joints have a thickness of from about 0.010 to 0.060 inch for horizontal joints and from about 0.010 to 0.125 inch for vertical joints.

6. The method of manufacturing laminated plastic tooling according to claim 1 wherein said pieces of boardstock are prepared by sawing from larger planks of boardstock.

7. The method of manufacturing laminated plastic tooling according to claim 1 including the further steps of modifying said tool by the steps of:
cutting away portions of the tool to be modified, said cutaway portions having at least one substantially flat surface;
adhesively laminating pieces of boardstock into said cutaway portions to extend beyond the desired new tool configuration;
milling the surface of said tool where necessary to produce the new configuration; and
smoothing at least the milled surface of the resulting reconfigured tool.

8. The method of manufacturing laminated plastic tooling according to claim 7 wherein at least some of said cutaway portions have a generally horizontal surface and an intersecting generally vertical surface, said surfaces being substantially perpendicular to each other.

9. The method of manufacturing laminated plastic tooling according to claim 7 including the further step of applying an anti-chafing coating to the smoothed surface of said reconfigured tool.

10. The method of manufacturing laminated plastic tooling according to claim 7 wherein said boardstock is formed from a material selected from epoxy and polyurethane resins.

11. The method of manufacturing laminated plastic tooling according to claim 7 wherein said adhesive is a two component, amine cured, epoxy resin.

12. The method of manufacturing laminated plastic tooling according to claim 7 wherein said adhesive joints have a thickness of from about 0.010 to 0.060 inch for horizontal joints and from about 0.010 to 0.125 inch for vertical joints.

13. The method of manufacturing laminated plastic tooling according to claim 7 wherein said pieces of boardstock are prepared by sawing from larger planks of boardstock.

14. The method of reconfiguring laminated plastic tooling which comprises the steps of:
providing tooling formed from a plastic material;
cutting away selected portions of said tooling in areas to be reconfigured, said cutaway portions having at least one flat surface;
laminating a plurality of pieces of plastic boardstock in said cutaway portions in an arrangement corresponding to the desired new configuration with an adhesive on all abutting surfaces;
curing said resin; and
milling said assembly to said new tool configuration under computer control.

15. The method of reconfiguring laminated plastic tooling according to claim 14 wherein said laminating step includes:
assembling a plurality of pieces of plastic boardstock in a selected arrangement in each cutaway portion corresponding to the desired new tool configuration;
checking the accuracy of said assembly configuration; removing said pieces;
cleaning surfaces of said pieces that were in contact with other pieces of said tool in said assembly;
coating said cleaned surfaces with said adhesive; reassembling said assembly;
curing said resin; and
milling said assembly to said new tool configuration under computer control.

16. The method of reconfiguring laminated plastic tooling according to claim 14 including the further step of smoothing the reconfigured tool in at least the filled cutaway portions.

17. The method of reconfiguring laminated plastic tooling according to claim 15 including the further step of coating said reconfigured tool with an anti-chafing coating.

18. The method of reconfiguring laminated plastic tooling according to claim 14 wherein said boardstock is formed from a material selected from epoxy and polyurethane resins.

19. The method of reconfiguring laminated plastic tooling according to claim 14 wherein said adhesive is a two component, amine cured, epoxy resin.

20. The method of reconfiguring laminated plastic tooling according to claim 14 wherein said adhesive joints have a thickness of from about 0.010 to 0.060 inch for horizontal joints and from about 0.010 to 0.125 inch for vertical joints.

21. The method of reconfiguring laminated plastic tooling according to claim 14 wherein said pieces of boardstock are prepared by sawing from larger planks of boardstock.

22. The method of reconfiguring laminated plastic tooling which comprises the steps of:
providing tooling formed from a plastic material;
cutting away selected portions of said tooling in areas to be reconfigured, said cutaway portions having at least one flat surface;
assembling a plurality of pieces of plastic boardstock in a selected arrangement corresponding to a desired tool configuration on said baseplate;
checking the accuracy of said assembly configuration; removing said pieces;
cleaning surfaces of said pieces that were in contact with other pieces in said assembly;
coating said cleaned surfaces with an adhesive; reassembling said assembly;
curing said resin;

milling said assembly to said tool configuration under computer control; and smoothing the surface of said tool.

23. The method of reconfiguring laminated plastic tooling according to claim 22 including the further step of smoothing the reconfigured took in at least the filled cutaway portions.

24. The method of reconfiguring laminated plastic tooling according to claim 23 including the further step of coating said reconfigured tool with an anti-chafing coating.

25. The method of reconfiguring laminated plastic tooling according to claim 22 wherein said boardstock is formed from a material selected from epoxy and polyurethane resins.

26. The method of reconfiguring laminated plastic tooling according to claim 22 wherein said adhesive is a two component, amine cured, epoxy resin.

27. The method of reconfiguring laminated plastic tooling according to claim 22 wherein said adhesive joints have a thickness of from about 0.010 to 0.060 inch for horizontal joints and from about 0.010 to 0.125 inch for vertical joints.

28. The method of reconfiguring laminated plastic tooling according to claim 22 wherein said pieces of boardstock are prepared by sawing from larger planks of boardstock.

* * * * *